US009967449B2

(12) United States Patent
Kim

(10) Patent No.: US 9,967,449 B2
(45) Date of Patent: May 8, 2018

(54) CAMERA SYSTEM AND AUTO FOCUSING METHOD THEREOF

(71) Applicant: LG INNOTEK CO., LTD., Seoul (KR)

(72) Inventor: Min Soo Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 765 days.

(21) Appl. No.: 13/906,015

(22) Filed: May 30, 2013

(65) Prior Publication Data

US 2013/0321587 A1    Dec. 5, 2013

(30) Foreign Application Priority Data

May 31, 2012  (KR) ........................ 10-2012-0058357

(51) Int. Cl.
*H04N 5/232* (2006.01)
*H04N 5/225* (2006.01)

(52) U.S. Cl.
CPC ....... *H04N 5/23212* (2013.01); *H04N 5/2258* (2013.01)

(58) Field of Classification Search
None
See application file for complete search history.

(56) References Cited

U.S. PATENT DOCUMENTS

| | | | |
|---|---|---|---|
| 2006/0262659 A1* | 11/2006 | Kurosawa | G02B 7/08 369/1 |
| 2007/0061022 A1* | 3/2007 | Hoffberg-Borghesani | G05B 19/0426 700/83 |
| 2009/0010493 A1* | 1/2009 | Gornick | G06K 9/00771 382/103 |
| 2009/0060487 A1 | 3/2009 | Lee et al. | |
| 2010/0080481 A1 | 4/2010 | Chen et al. | |
| 2010/0097444 A1* | 4/2010 | Lablans | G03B 35/00 348/46 |
| 2011/0007135 A1* | 1/2011 | Okada | G11B 27/322 348/46 |
| 2011/0149041 A1* | 6/2011 | Eccles | G06T 7/0018 348/46 |
| 2011/0169921 A1* | 7/2011 | Lee | H04N 5/23212 348/46 |

FOREIGN PATENT DOCUMENTS

| | | |
|---|---|---|
| CN | 1115390 A | 1/1996 |
| CN | 1519637 A | 8/2004 |
| CN | 101785025 A | 7/2010 |
| CN | 101968603 A | 2/2011 |
| CN | 102103248 A | 6/2011 |

* cited by examiner

*Primary Examiner* — Edemio Navas, Jr.
(74) *Attorney, Agent, or Firm* — Birch, Stewart, Kolasch & Birch, LLP

(57) ABSTRACT

Disclosed is a camera system, the camera system including a first camera photographing an object image, a second camera including an actuator moving a lens for focusing, a 3-D depth extraction unit extracting a 3-D depth using object images photographed by the first and second cameras, a memory unit stored with position information of a lens corresponding to a 3-D depth data of an object image, and a controller driving the actuator by reading the position information of the lens corresponding to the 3-D depth of the object image stored in the memory unit based on 3-D depth data extracted by the 3-D depth extraction unit.

1 Claim, 3 Drawing Sheets

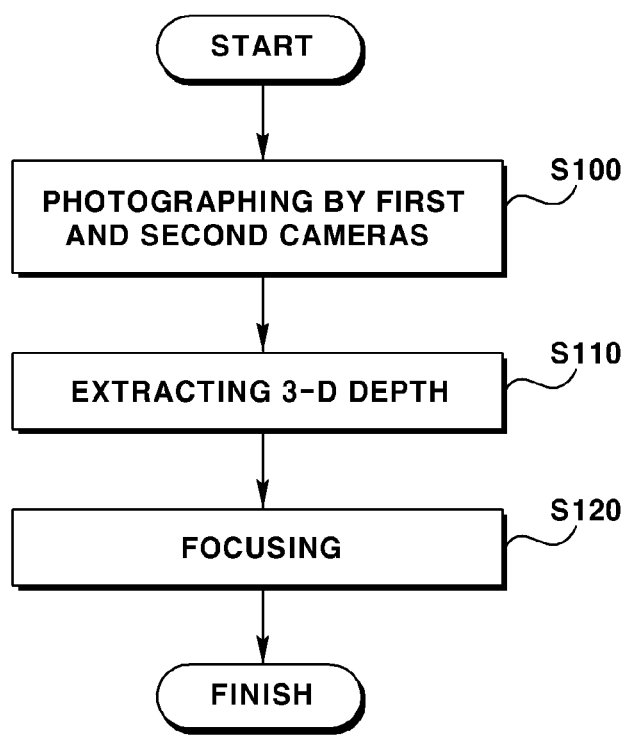

CAMERA SYSTEM AND AUTO FOCUSING METHOD THEREOF

Pursuant to 35 U.S.C. § 119 (a), this application claims the benefit of earlier filing date and right of priority to Korean Patent Application No. 10-2012-0058357 filed on May 31, 2012, the contents of which are hereby incorporated by reference in their entirety.

BACKGROUND OF THE DISCLOSURE

Field of Endeavor

The teachings in accordance with exemplary and non-limiting embodiments of this disclosure relate generally to a camera system and an auto-focusing method thereof.

Background

This section provides background information related to the present disclosure which is not necessarily prior art.

In general, a compact small camera module is applied to mobile terminal devices such as camera modules, PDAs (Personal Digital Assistants), and smart phones and various IT (Information Technology) devices.

The camera module is manufactured using an image sensor such as a charge coupled device (CCD) or a complementary metal oxide semiconductor (CMOS), and manufactured to adjust a camera focus for adjustment of size of an image. Furthermore, the camera module includes a plurality of lens, and is mounted with a driving source to move the lenses, whereby an optical distance is adjusted by changing a relative distance of each lens.

Recently, concomitant with development of technologies, a high pixel camera module is being developed, and this camera module is equipped with auto focus function automatically adjusting a focus of an object.

The conventional auto focus method includes a mountain climb control method and a full scan control method In the conventional methods, a lens is moved stage by stage, searches for a changed image relative to a previous image, performs a fine search again and stops at a point of the find search.

At this time, errors are generated on auto focus accuracy and completion time in response to frame speed, at which portion the auto focus is centered and changed degree of an object.

Furthermore, there is another disadvantage in the conventional methods in that an auto focusing time is lengthened because the auto focusing is performed by the multiple-stage searching.

SUMMARY OF THE DISCLOSURE

This section provides a general summary of the disclosure, and is not a comprehensive disclosure of its full scope or all of its features.

The present disclosure provides a camera system configured to increase auto focusing accuracy and to shorten an auto focusing time, and an auto focusing method thereof.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a camera system, the camera system comprising: a first camera photographing an object image; a second camera photographing an object image and including an actuator for moving a lens; a 3-D depth extraction unit extracting a 3-D depth data extracted by the 3-D depth extraction unit using object images photographed by the first and second cameras; and a controller driving the actuator based on the 3-D depth data extracted by the 3-D depth extraction unit.

Preferably, but not necessarily, the camera system may further comprise a memory unit stored with position information of a lens corresponding to the 3-D depth data of an object image.

Preferably, but not necessarily, the controller may drive the actuator in response to the 3-D depth data extracted by the 3-D depth extraction unit by reading position information of a lens corresponding to the 3-D depth of an object image stored in the memory unit.

Preferably, but not necessarily, the controller may be an MCU (Micro control unit) chip or a multi-media chip.

Preferably, but not necessarily, the camera system may further comprise an image signal processing unit processing and outputting an object image photographed by the second camera by receiving the object image photographed by the second camera.

Preferably, but not necessarily, the image signal processing unit may be embedded in the controller.

Preferably, but not necessarily, the camera system may further comprise a recognition unit configured to recognize any one of a motion, a face and a shape of an object by receiving a 3-D depth data of an object image extracted by the 3-D depth extraction unit.

In another general aspect of the present disclosure, there is provided a camera system, the camera system comprising: a first camera photographing an object image and including a first actuator for moving a lens; a second camera photographing an object image and including a second actuator for moving a lens; a 3-D depth extraction unit extracting a 3-D depth using object images photographed by the first and second cameras; and a memory unit stored with position information of a lens corresponding to a 3-D depth data of an object image; and a controller driving the first actuator of the first camera or the second actuator of the second camera by the position information of the lens corresponding to the 3-D depth of the object image stored in the memory unit based on 3-D depth data extracted by the 3-D depth extraction unit.

Preferably, but not necessarily, the camera system may further comprise a 3-D image synthesizer synthesizing object images photographed by the first camera and the second camera.

Preferably, but not necessarily, the camera system may further comprise a recognition unit configured to recognize any one of a motion, a face and a shape of an object by receiving a 3-D depth data of an object image extracted by the 3-D depth extraction unit.

In another general aspect of the present disclosure, there is provided an auto focus method of a camera system, the method comprising: photographing an object image by a first camera and a second camera including an actuator moving a lens; extracting a 3-D depth data from the object image photographed by the first and second cameras; and performing a focusing of the second camera by driving the actuator of the second camera based on the extracted 3-D depth data.

In still another general aspect of the present disclosure, there is provided an auto focus method of a camera system, the method comprising: photographing an object image by a first camera including a first actuator moving a lens and a second camera including a second actuator moving a lens; extracting a 3-D depth data from the object image photographed by the first and second cameras; and performing a focusing by driving the first actuator of the first camera or a second actuator of the second camera based on the extracted 3-D depth data.

In advantageous effect, the exemplary embodiments of the present disclosure can improve auto focus accuracy and shorten an auto focusing time by performing auto focusing 3-D depth information.

In another advantageous effect, the exemplary embodiments of the present disclosure can perform auto focusing by two cameras photographing 3-D images using depth information.

BRIEF DESCRIPTION OF THE DRAWINGS

FIG. 4 is a flowchart illustrating an auto focus method of a camera system according to an exemplary embodiment of the present disclosure.

DETAILED DESCRIPTION

Hereinafter, exemplary embodiments of the present disclosure will be described in detail with reference to the accompanying drawings.

In describing the present disclosure, the size and relative sizes of layers, regions and/or other elements may be exaggerated or reduced for clarity. Furthermore, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

Figure 1:
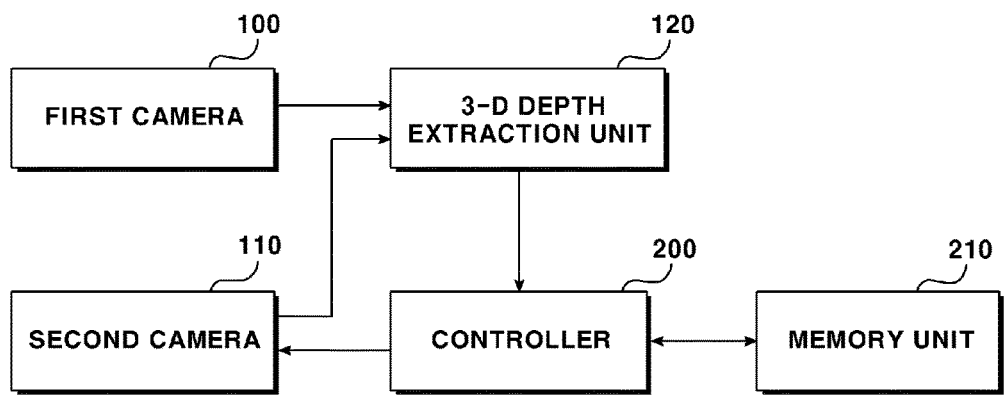
FIG. 1 is a block diagram illustrating a camera system according to an exemplary embodiment of the present disclosure.

FIG. 1 is a block diagram illustrating a camera system according to an exemplary embodiment of the present disclosure.

The camera system according to an exemplary embodiment of the present disclosure may include a first camera 100 photographing an object image; a second camera 110 for photographing an object image and including an actuator for moving a lens; a 3-D depth extraction unit 120 extracting a 3-D depth data extracted by the 3-D depth extraction unit 120 using object images photographed by the first and second cameras 100, 110; a memory unit 210 stored with position information of a lens corresponding to the 3-D depth data of an object image; and a controller 200 driving the actuator by reading position information of a lens using the 3-D depth data of an object image stored in the memory unit by receiving the 3-D depth data extracted by the 3-D depth extraction unit 120.

Thus, according to the camera system according to an exemplary embodiment of the present disclosure, a same object image can be photographed by the first camera 100 and the second camera 110, and the 3-D extraction unit 120 can extract a 3-D depth from the object image photographed by the first camera 100 and the second camera 110.

The controller 200 receives data of the 3-D depth of the object image extracted from the 3-D depth extraction unit 120, and reads position information of a lens corresponding to the 3-D depth of an object image stored in the memory unit 210 to perform the focusing of an actuator.

Hence, the exemplary embodiments of the present disclosure has an advantageous effect of improving auto focus accuracy and shortening an auto focusing time by performing auto focusing the 3-D depth information.

That is, the camera system according to an exemplary embodiment of the present disclosure can read, from the memory unit 210, the extracted real-time 3-D depth information and the position information of a lens corresponding to the 3-D depth information for auto focusing to perform the auto focusing by moving the lens to a desired position.

Thus, the camera system according to an exemplary embodiment of the present disclosure can move the lens to a position at one frame to reduce the auto focusing time.

At this time, the memory unit 210 may store position information of a lens relative to the 3-D depth information, where the position information of lens may be stored in the memory unit 210 by being calibrated in advance and recorded in a look-up table format. Furthermore, the controller 200 may calculate the position information of a lens based on the extracted real-time 3-D depth information, without being relied on the information from the memory unit 210.

In short, the position information of a lens corresponding to the 3-D depth data of an object image stored in the memory unit 210 is position information relative to the 3-D depth information, and the focusing is performed by driving an actuator using the position information of the lens.

Furthermore, the controller 200 may perform the focusing by driving an actuator using the extracted real-time 3-D depth information of object image, without being relied on the information from the memory unit 210.

Furthermore, the camera system according to an exemplary embodiment of the present disclosure can recognize a motion, a face and a shape of an object using the 3-D depth data.

To this end, the camera system according to an exemplary embodiment of the present disclosure may further include a recognition unit configured to recognize any one of a motion, a face and a shape of an object by receiving the 3-D depth data of the object image extracted by the extraction unit 120.

Figure 2:
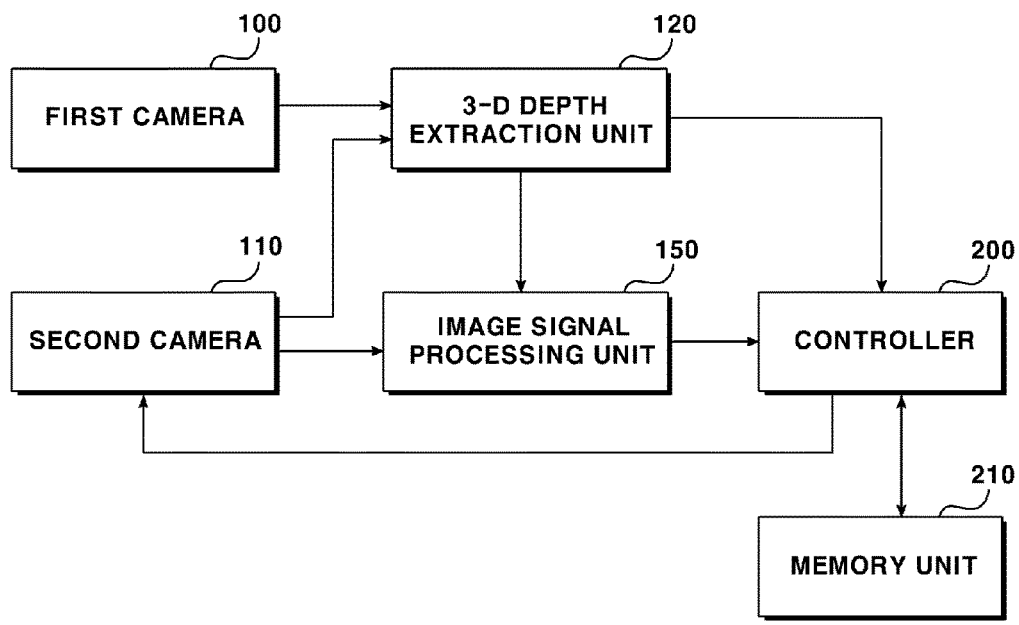
FIG. 2 is a block diagram illustrating a camera system according to another exemplary embodiment of the present disclosure.

Referring to FIG. 2, a camera system according to another exemplary embodiment of the present disclosure may further include an image signal processing unit 150 configured to process and output an object image photographed by the second camera 110 by receiving the object image.

The image signal processing unit 150 may be called an image signal processor. Furthermore, the controller 200 may be an MCU (Micro Control Unit) chip or a multi-media chip. The image signal processing unit 150 may be embedded in the controller 200.

Figure 3:
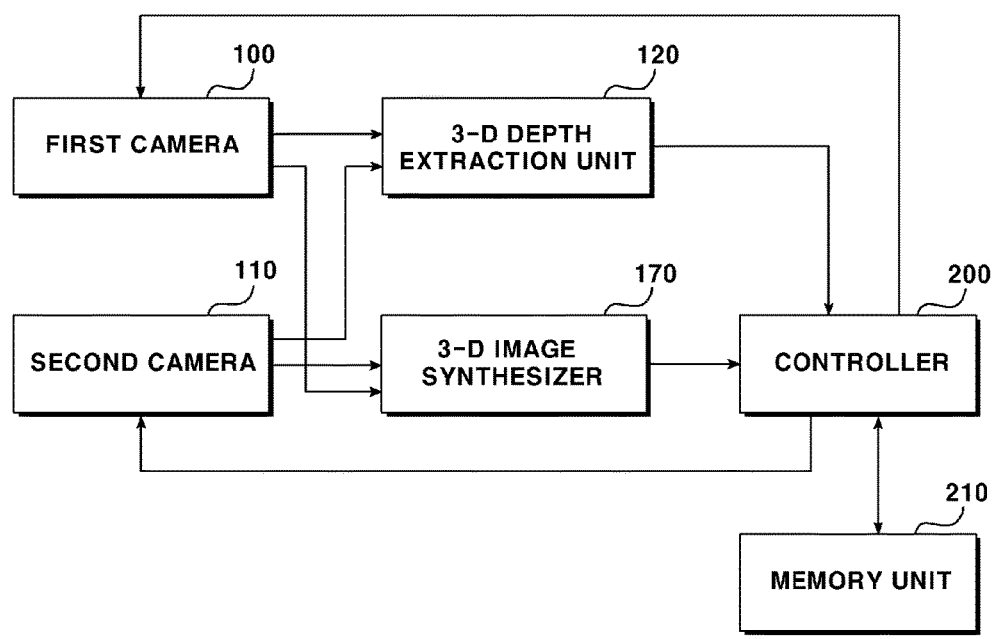
FIG. 3 is a block diagram illustrating a camera system according to still another exemplary embodiment of the present disclosure.

FIG. 3 is a block diagram illustrating a camera system according to still another exemplary embodiment of the present disclosure.

The camera system according to still another exemplary embodiment of the present disclosure may include a first camera 100 photographing an object image and including a first actuator for moving a lens; a second camera 110 photographing an object image and including a second actuator for moving a lens; a 3-D depth extraction unit 120 extracting a 3-D depth using an object image photographed by the first and second cameras 100, 110; a memory unit 210 stored with position information of a lens corresponding to a 3-D depth data of the object image; and a controller 200 driving the first actuator of the first camera or the second actuator of the second camera by reading the position information of the lens corresponding to the 3-D depth of the object image stored in the memory unit based on 3-D depth data extracted by the 3-D depth extraction unit.

That is, the camera system according to still another exemplary embodiment of the present disclosure can photograph a 3-D object image, and realize a 3-D image based on binocular disparity caused by a distance between two eyes of a user by photographing an object using the first camera 100 and the second camera 110.

At this time, the camera system according to still another exemplary embodiment of the present disclosure may further include a 3-D image synthesizer synthesizing object images photographed by the first camera 100 and the second camera 110.

Hence, the first camera 100 and the second camera 110 in the camera system according to still another exemplary embodiment of the present disclosure can photograph object images, and the 3-D depth extraction unit 120 can extract a 3-D depth from the object image photographed by the first camera 100 and the second camera 110.

At this time, the controller 200 may perform the focusing by receiving data relative to a distance to the object extracted by the 3-D depth extraction unit 120, reading position information of a lens corresponding to the 3-D depth of an object image stored in the memory unit 210, and controlling the driving of the first actuator of the first camera 100 and the second actuator of the second camera 110. The focusing may be performed by driving only one actuator of the first camera 100 or the second camera 110.

Thus, two cameras photographing the 3-D object images may also perform the auto focusing the depth information according to still another exemplary embodiment of the present disclosure.

Meanwhile, the camera system according to still another exemplary embodiment of the present disclosure may also further include a recognition unit configured to recognize any one of a motion, a face and a shape of an object by receiving the 3-D depth data of the object image extracted by the 3-D depth extraction unit 120.

The camera system according to still another exemplary embodiment of the present disclosure may further include an image signal processing unit 150 configured to process and output an object image photographed by the second camera 110 by receiving the object image.

The image signal processing unit 150 may be called an image signal processor (ISP).

Furthermore, the controller 200 may be an MCU (Micro Control Unit) chip or a multi-media chip. The image signal processing unit 150 may be embedded in the controller 200.

FIG. 4 is a flowchart illustrating an auto focus method of a camera system according to an exemplary embodiment of the present disclosure.

The auto focus method of a camera system according to an exemplary embodiment of the present disclosure first includes photographing an object image by a first camera and a second camera including an actuator moving a lens for focusing (S100).

Successively, the method includes extracting a 3-D depth data from the object image photographed by the first and second cameras (S110), and performing a focusing of the second camera by driving the actuator of the second camera and by calculating position information of a lens based on the extracted 3-D depth data (S120).

At this time, the first camera may include an actuator moving a lens for focusing, and the method may further include, after the step of S100, performing the focusing of the first camera by driving the actuator of the first camera using the extracted 3-D depth data.

Although the present disclosure has been described with reference to a number of illustrative embodiments thereof, it should be understood that numerous other modifications and embodiments can be devised by those skilled in the art that will fall within the spirit and scope of the principles of this disclosure.

What is claimed is:

1. A camera system, the camera system comprising:
a first camera photographing an object image and provided without an actuator;
a second camera photographing an object image and including an actuator for moving a lens;
a 3-D depth extraction processor configured to extract a 3-D depth data using object images photographed by the first and second cameras;
a controller comprising an MCU (Micro control unit) chip or a multi-media chip configured to drive the actuator of the second camera based on the 3-D depth data extracted by the 3-D depth extraction processor to perform focusing;
a memory configured to store focusing position information of the lens of the second camera corresponding to the 3-D depth data of the object image;
an image signal processing unit processing and outputting an object image photographed by the second camera by receiving the object image photographed by the second camera; and
a recognition unit configured to recognize any one of a motion, a face and a shape of an object by receiving a 3-D depth data of an object image extracted by the 3-D depth extraction unit,
wherein the controller drives the actuator of the second camera in response to the 3-D depth data extracted by the 3-D depth extraction processor by reading focusing position information of the lens of the second camera corresponding to the 3-D depth of the object image stored in the memory.

* * * * *